US008740133B2

(12) United States Patent
Saucray et al.

(10) Patent No.: US 8,740,133 B2
(45) Date of Patent: Jun. 3, 2014

(54) AIRCRAFT INCLUDING AN ENGINE CONTROLLED BY SYNCHROPHASING

(75) Inventors: Jean-Michel Saucray, Villeneuve les Bouloc (FR); Philippe Chareyre, La Salvetat Saint Gilles (FR)

(73) Assignee: Airbus Operations, Toulouse (FR)

( * ) Notice: Subject to any disclaimer, the term of this patent is extended or adjusted under 35 U.S.C. 154(b) by 801 days.

(21) Appl. No.: 13/055,340

(22) PCT Filed: Jul. 21, 2009

(86) PCT No.: PCT/FR2009/051464

§ 371 (c)(1), (2), (4) Date: Apr. 15, 2011

(87) PCT Pub. No.: WO2010/010293

PCT Pub. Date: Jan. 28, 2010

(65) Prior Publication Data

US 2011/0189017 A1 Aug. 4, 2011

(30) Foreign Application Priority Data

Jul. 24, 2008 (FR) ..................................... 08 55063

(51) Int. Cl.
*B64C 1/40* (2006.01)

(52) U.S. Cl.
USPC ........................... 244/1 N; 244/17.23; 413/34

(58) Field of Classification Search
USPC .......... 244/1 N, 17.23, 17.11, 69; 416/34, 33; 381/71.1
See application file for complete search history.

(56) References Cited

U.S. PATENT DOCUMENTS 4,689,821 A 8/1987 Salikuddin et al.
4,947,356 A * 8/1990 Elliott et al. .................. 700/280
5,221,185 A 6/1993 Pla et al.
5,453,943 A * 9/1995 Magliozzi ..................... 700/280
5,490,436 A 2/1996 Coyne et al.
5,551,649 A * 9/1996 Kaptein ........................ 244/1 N
2005/0065712 A1 3/2005 Skilton
2007/0084963 A1* 4/2007 Nouhaud .................. 244/17.23
2011/0198440 A1* 8/2011 Saucray et al. ................. 244/69

FOREIGN PATENT DOCUMENTS

EP 1 296 082 A2 3/2003
GB 2 275 984 A 9/1994
WO WO 2005/042959 A2 5/2005
WO WO 2006/017201 A1 2/2006
WO WO 2008/079431 A2 7/2008

OTHER PUBLICATIONS

International Search Report for International Patent Application No. PCT/FR2009/051464, mailed on Jan. 18, 2010 (w/English translation).

(Continued)

*Primary Examiner* — Christopher P Ellis
(74) *Attorney, Agent, or Firm* — Oliff PLC

(57) ABSTRACT

An aircraft including at least one engine having counter-rotating rotors, the engine or at least one of the engines having imbalances associated with at least one ellipse. The aircraft includes at least one vibration damper attached in an arrangement such that, at a given engine speed and for at least one given common direction of a large axis of the ellipse or at least one of the ellipses, a speed related to the two ends of the damper is higher than for any other arrangement of the damper.

9 Claims, 3 Drawing Sheets

50
64
60
56
54
68
62
70
66
52

(56) References Cited

OTHER PUBLICATIONS

Written Opinion for International Patent Application No. PCT/FR2009/051464, mailed on Jan. 18, 2010.

Preliminary Search Report for priority French Patent Application No. 0855063, dated Mar. 10, 2009.

International Search Report for corresponding International Patent Application No. PCT/FR2009/051463, mailed on Jan. 18, 2010 (w/English translation).

Preliminary Search Report for corresponding French Patent Application No. 0855062, dated Mar. 10, 2009.

* cited by examiner

AIRCRAFT INCLUDING AN ENGINE CONTROLLED BY SYNCHROPHASING

FIELD OF THE INVENTION

The invention relates to aircraft comprising at least one engine having counter-rotating rotors.

It may be an engine with counter-rotating propellers such as a propfan type turboprop, or an engine of a rotary-wing aircraft such as a helicopter.

BACKGROUND OF THE INVENTION

In the air transport industry, research studies have been conducted for many years to reduce the vibrations and noise produced by the engines. Various techniques have been used.

Passive or active balancing techniques are also known, in which the inertial or aerodynamic imbalance is measured and corrected, as is the case for example in document WO-2006/017201.

Other "synchrophasing" techniques are also known, where synchrophasing between several engines limits the noise generated at the blade passing frequency, as is the case for example in documents U.S. Pat. No. 4,689,821, US-2005/0065712, WO-2005/042959 and US-00/5221185. The main problem with these techniques for balancing and synchrophasing by the engine control system is that the control system delay must be much less than the period separating the passage of two blades in front of the sensor used. This is never the case, however, which means that no industrial applications can be considered.

Techniques to filter and attenuate the vibrations generated in the aircraft are also known. They consist for example of active or semi-active systems with active weights, variable stiffness or rheological fluids (as described in document U.S. Pat. No. 5,490,436). These techniques also include systems equipped with sensors and control architectures to command active or semi-active actions. These techniques have been developed to limit the impact of imbalance forces on the supporting structure.

In reference to FIG. 1, we will first describe the imbalance problem for a single rotating disc. This figure shows a disc forming a propeller 2 comprising blades 4, in this case eight. The propeller can rotate freely around an axis 6 corresponding to its main geometric axis of symmetry. We assume that the propeller has a balancing fault such that the center of gravity of the propeller is not on axis 6 but is shifted radially from it. This center of gravity 8 is for example located on one of the blades 4, as shown, rather exaggerated, on FIG. 1. We assume that the propeller is rotated around its axis 6 in the direction shown by the arrow 10. The center of gravity 8 therefore generates an imbalance force 12 exerted on the propeller on the axis 6 in the plane of the disc along a radial direction towards the outside and passing through point 8. This force rotates in direction 10. It is an inertial imbalance. Consequently, for any rotating disc whose center of inertia does not coincide with the center of rotation, an inertial imbalance produces a radial force in the plane of the disc as shown on FIG. 1.

In reference to FIG. 2, there may also be an aerodynamic imbalance. This is the case when the moving disc comprises bearing surfaces such as the faces of propeller blades. A setting fault or a shape fault on the bearing surfaces may therefore generate an aerodynamic imbalance. There could also be a problem of dispersion of aerodynamic deformation of the blades or of dispersion of the blade pitch. The aerodynamic imbalance force is exerted at a point 14 located away from axis 6. The imbalance force is composed firstly of a traction force increment referenced 16 on FIG. 2 and located outside the plane of the propeller disc, and a drag force increment 18 located in the plane of the propeller disc.

We will now describe some balancing techniques in greater detail. We know in fact how to measure the imbalance forces of a rotating machine (or of a rotating disc), distinguishing between the amplitude and the phase angle of the force with respect to a fixed axis. One of these techniques is as follows for example. To eliminate the vibrations at a specific speed of rotation, we first measure the imbalance characteristics of the rotating machine. We therefore measure or calculate the imbalance forces it produces. These forces are characterized by a sinusoidal excitation in the engine speed frequency range in a fixed reference coordinate system with respect to the rotating part, for example related to the supporting structure. These excitations are generally measured using an engine vibration sensor (e.g. an accelerometer) or a set of dedicated accelerometers. The imbalance of a rotating disc is therefore represented by the measured acceleration R1 in terms of amplitude (gain) and phase (ϕ) in the axis of the fixed supporting structure at the machine speed of rotation $\omega_o$ as shown on FIG. 3. This figure shows on a first curve 20 the graph of gain (in $m/s^{-2}$) against speed of rotation ω (in rad/s), and on the second curve 22 the graph of phase ϕ (in radians) against this speed.

The following measurement method, called the vector influence coefficient method, can be used. After measuring the initial acceleration R1, which represents the result of the action of the imbalance required, imbalance masses of known weight are added to the rotating system to measure their effect on the measured acceleration. For example, an imbalance of unit mass is added to the disc at phase angle 0° and a new acceleration R2 (gain and phase) at speed $\omega_o$ is measured.

We then calculate a vector solution as follows:

the original imbalance b1 causes acceleration R1, the set (b1+b2) forming the sum of the original imbalance and of the unit imbalance causes an acceleration R2, by deduction, the unit imbalance b2 therefore generates the acceleration R2−R1. Concerning this subject, we refer to FIG. 4 which shows in an orthonormal coordinate system the vectors R1, R2 and R2−R1 which have respectively phases ϕR1, ϕR2 and ϕ(R2−R1).

Note here that this calculation method assumes that there is a linear relation between the imbalance and the corresponding measured acceleration.

The original imbalance and the correction mass required as a result are therefore calculated as follows:

$$\begin{cases} \|\overrightarrow{b_1}\| = \|\overrightarrow{b_2}\| \cdot \dfrac{\|\overrightarrow{R_1}\|}{\|\overrightarrow{R_2} - \overrightarrow{R_1}\|} \\ \varphi_{\overline{b}_1} = \varphi_{\overline{b}_2} + \varphi_{\overline{R}_1} - \varphi_{\overline{R}_2 - \overline{R}_1} \end{cases}$$

To obtain better results and minimize the measurement errors, several steps of adding weights and measuring accelerations, with accelerations R3 and R4 for example, can be carried out.

Note that the inertial and aerodynamic imbalances may have to be measured separately. The above-mentioned technique can be used to do this, providing in addition that modifications of the speed of rotation and independent modifications of the torque request can be made, in order to distinguish between the source of imbalance due to inertia and the source of imbalance due to the aerodynamic characteristics of the rotor.

Similarly, when the rotating machine comprises two or, more rotors, the same approach can be reproduced for each rotor disc one after the other. In this case, imbalance diagnostic software programs supply balancing solution vectors which include one solution vector for the first rotor and one solution vector for the second rotor. Each solution vector includes a modulus and a phase angle. This operation will be carried out to characterize the inertial imbalance and then to characterize the aerodynamic imbalance.

We will now describe, in reference to FIG. 5, the problem of imbalance of two counter-rotating discs. As for a single disc, with two counter-rotating discs, the inertial imbalance of each disc produces a radial force in the plane of the corresponding disc. FIG. 5 shows these forces PROP1 24 and PROP2 26 which are exerted at the axis of rotation 6 common to the two discs. The two discs rotate in different directions, indicated respectively 28 and 30 on FIG. 5. The imbalance forces 24 and 26 also rotate in opposite directions, respectively 28 and 30.

We now consider the force PROP 1+2 resulting from the sum of the two imbalance forces PROP1 and PROP2 as observed from the sump of the rotating machine or its supporting structure. The modulus of this resultant force varies depending on the relative position of the discs. Over time, this modulus describes an ellipse 32 centered on the axis 6, whose minor axis is equal to the difference between the moduli of forces PROP1 and PROP2 and a major axis 34 equal to the sum of the two moduli.

We now consider the special case wherein the moduli of the two forces PROP1 and PROP2 are equal. Consequently, the length of the minor axis of the ellipse is zero and the resultant force PROP 1+2 is equal to the sum of the moduli of the two forces, making it a pure oscillating impact force. The ellipse is therefore reduced to a line segment. For example, if we assume that phase $\phi$ is equal to 0 when the two radial forces PROP1 (or $R_{disc1}$) and PROP2 (or $R_{disc2}$) are in phase, the resultant radial force R can be described as follows:

$$R(\omega t)=R_{disc1}(\omega t)+R_{disc2}(\omega t)$$

$$R(\omega t+\pi/2)=R_{disc1}(\omega t+\pi/2)-R_{disc2}(\omega t+\pi/2)$$

$$R(\omega t+\pi)=-[R_{disc1}(\omega t)+R_{disc2}(\omega t)]$$

$$R(\omega t+3\pi/2)=R_{disc2}(\omega t+3\pi/2)-R_{disc1}(\omega t+3\pi/2)$$

In addition, the resultant moment M outside the plane can be described as follows:

$$M(\omega t)=0$$

$$M(\omega t+\pi/2)=[R_{disc1}(\omega t)+R_{disc2}(\omega t)]*\text{leverarm}$$

$$M(\omega t+\pi)=0$$

$$M(\omega t+3\pi/2)=-[R_{disc1}(\omega t)+R_{disc2}(\omega t)]*\text{leverarm}$$

The moment located outside the plane is expressed at the center of the disc 1 for example. In addition, the lever arm is the axial distance between the planes of discs 1 and 2.

The direction of the major axis of the ellipse depends on the relative phase between the imbalance forces PROP1 and PROP2. For example, if the positions of the two discs are such that the two forces are in phase in the vertical axis, the maximum excitation in the plane of the discs will be directed vertically. In contrast, if the positions of the two discs are such that the two forces are in phase opposition (180° shift) in the vertical direction, the maximum excitation in the plane of the discs will be directed horizontally.

When the two counter-rotating discs incorporate aerodynamic bearing surfaces, the forces located outside the planes of the discs generate moments passing through the center of rotation of each disc. Consequently, as with the case of the inertial imbalance, the principle of vector summing described for the radial forces is applicable for the moments generated by the aerodynamic imbalance forces as shown on FIG. 6. This figure shows Moment 1 referenced 38 associated with disc 1 rotating in direction 28 and Moment 2 referenced 40 associated with disc 2 and rotating in direction 42. The vector sum Moments 1+2 of the two moments describes an ellipse 44.

Whether in case of inertial imbalance or aerodynamic imbalance, when the two discs rotate at the same speed, the major axis of the ellipse remains fixed with respect to a fixed axis corresponding for example to the engine supporting structure. Inversely, if the speeds of rotation of the discs are not the same, the axis of the ellipse rotates at a speed equal to the difference between the speeds of the two discs.

Note here that in addition to the rotating forces located outside the plane of the discs, local moments are generated between the two planes of the discs. The moduli of these moments depend on the distance between the two rotating discs.

The known vibration reduction techniques prove relatively inefficient, however, especially for engines having counter-rotating rotors.

OBJECT AND SUMMARY OF THE INVENTION

One objective of the invention is to reduce the vibrations generated in the supporting structure by engines of this type.

The invention therefore provides for a method for manufacturing an aircraft comprising at least one engine having counter-rotating rotors, the engine or at least one of the engines having imbalances associated with at least one ellipse, method wherein at least one vibration damper is attached to the aircraft in an arrangement such that, at a given engine speed and for at least one given direction of a major axis of the ellipse or at least one of the ellipses, a relative speed of two ends of the damper is higher than for any other arrangement of the damper.

Consequently, the ends of the damper forming its interfaces with the aircraft elements it connects, the arrangement of the damper is chosen such that absorption of the vibrations is maximized. Synchrophasing can then be carried out to channel the vibrations in this direction so that they are absorbed by the damper. Consequently, rather than trying to attenuate or compensate the vibrations where they are produced, the aim is to dampen them in the direction where this dampening is the most efficient. By channeling them in this direction, very high attenuation can be obtained. The impact of the engine vibrations on the aircraft supporting structure can therefore be considerably reduced. Unlike the known balancing, filtering and dissipation techniques which are implemented to a large extent independently of the imbalance forces present, the invention controls the amplitude and direction of the imbalance forces so that the vibration absorption means can be optimized for better reduction of the vibrations felt.

The damper or one of the dampers could be placed for example between the mast supporting the engine and the engine itself, between the mast and the fuselage, between the mast and another part, between two parts of the mast, between two parts supporting the engine, etc.

The invention also provides for an aircraft comprising at least one engine having counter-rotating rotors, the engine or at least one of the engines having imbalances associated with at least one ellipse, the aircraft comprising at least one vibration damper attached in an arrangement such that, at a given engine speed and for at least one given direction of a major axis of the ellipse or at least one of the ellipses, a relative speed of two ends of the damper is higher than for any other arrangement of the damper.

Advantageously, the arrangement of the damper is such that the relative speed is higher than for any other arrangement of the damper, irrespective of the direction of the major axis.

The arrangement of the damper therefore makes the vibration absorption even more efficient.

Preferably, the arrangement of the damper is such that there is one direction of the major axis for which, at the given speed, the relative speed of the two ends is higher than for any other direction of the major axis.

This makes the vibration absorption even more efficient.

Advantageously, the aircraft comprises at least one sensor, preferably attached to the engine, capable of measuring the engine vibrations, the aircraft comprising for example at least two sensors capable of measuring the engine vibrations in two directions perpendicular to each other.

Advantageously, the aircraft comprises means capable of controlling the engine or at least one of the engines in order to keep the major axis in a constant direction, preferably a direction in which the relative speed is higher than for any other direction of the major axis.

The invention also provides for a method for controlling an aircraft according to the invention, wherein the engine or at least one of the engines is controlled so as to keep the major axis in a constant direction.

The invention also provides for a computer program which includes instructions that can control execution of a method according to the invention when it is executed on a computer, and a data storage medium which includes such program.

BRIEF DESCRIPTION OF THE DRAWINGS

Other characteristics and advantages of the invention will appear on reading the description of a preferred embodiment given as a non-limiting example, and referring to the attached drawings in which.

MORE DETAILED DESCRIPTION

Figure 1:
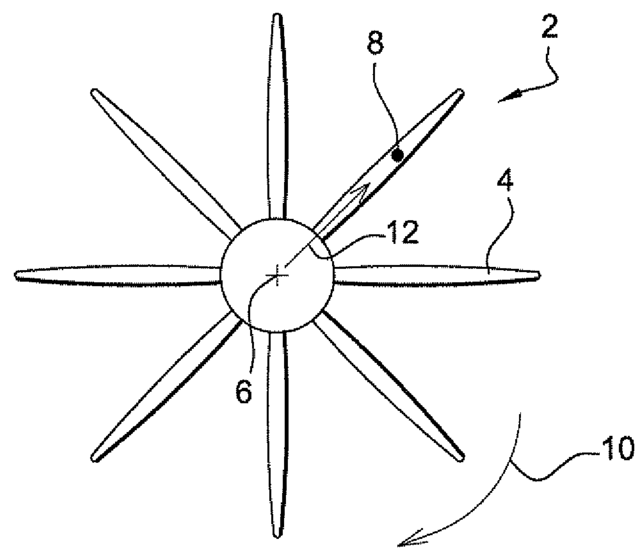
FIGS. 1 and 2 are front and perspective views respectively of a rotating disc of the prior art.
Figure 2:
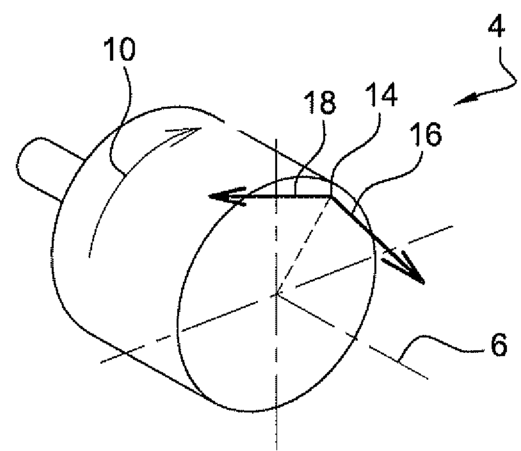
Figure 3:
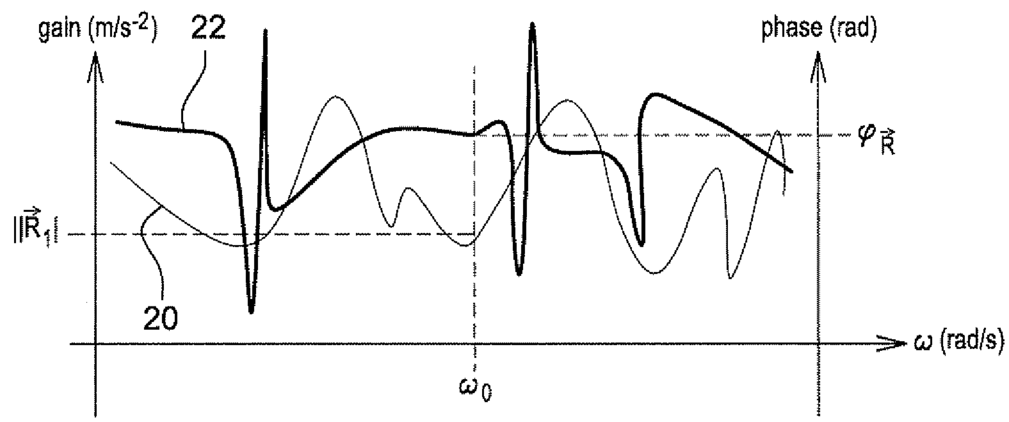
FIG. 3 shows a graph of the gain and phase of an imbalance force as a function of the speed of the rotating disc of FIG. 1.
Figure 4:
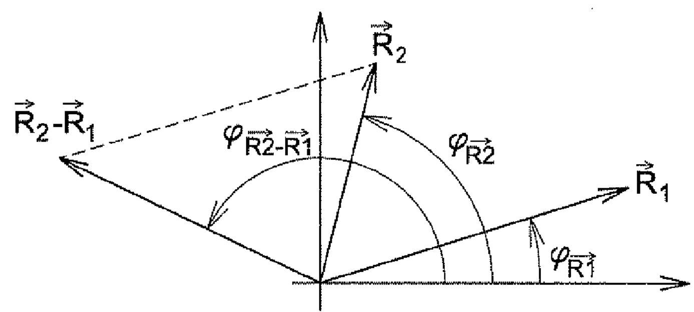
FIGS. 4 to 6 are diagrams showing, in vector form, imbalance forces in the disc of FIG. 1.
Figure 5:
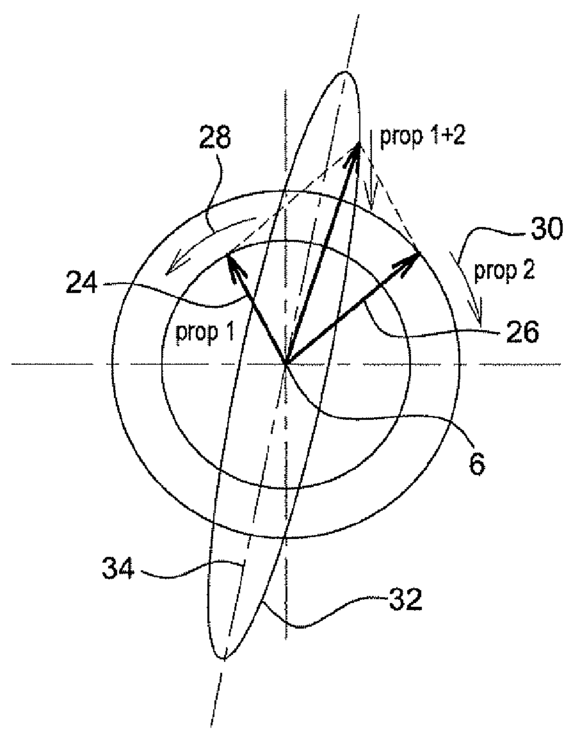
Figure 6:
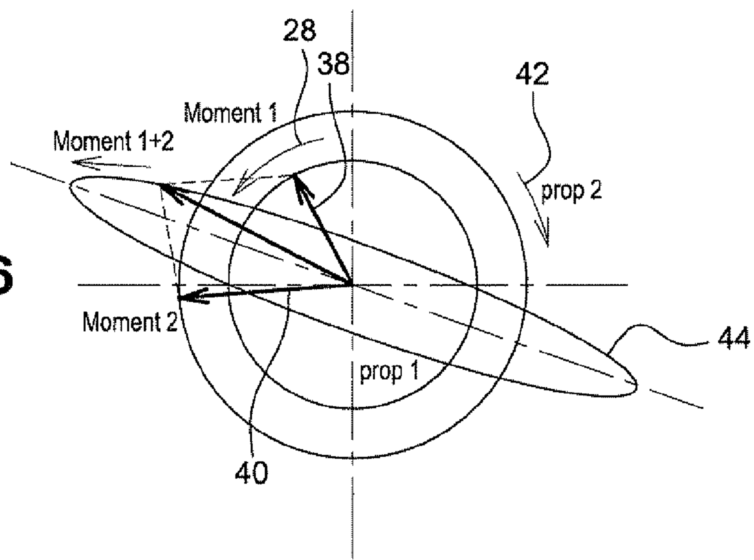
Figure 7:
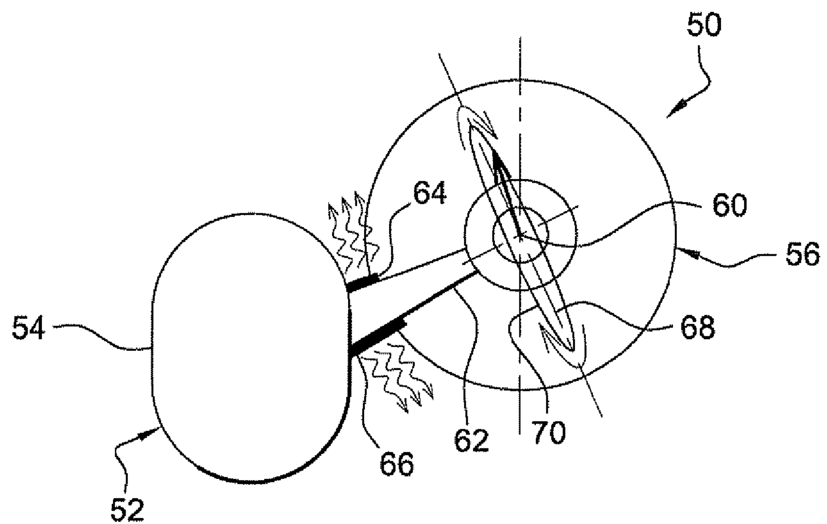
FIG. 7 is a diagrammatic elevation view of an aircraft according to one embodiment of the invention.
Figure 8:
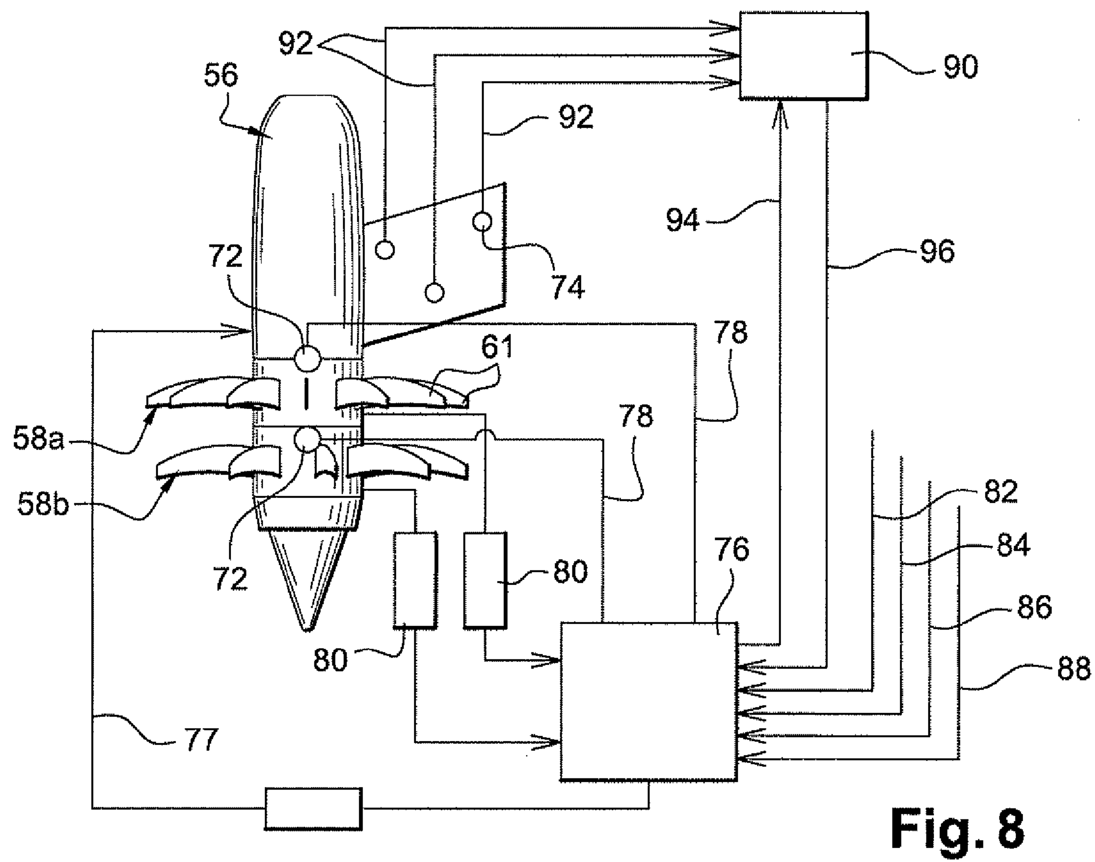
FIG. 8 is a diagram showing the architecture for controlling the engine in the aircraft of FIG. 7.

In reference to FIGS. 7 and 8, the aircraft 50 according to the invention comprises in this embodiment a main structure 52 comprising in particular a fuselage 54. It is assumed in this example that the aircraft comprises engines 56, in this case two, arranged symmetrically with respect to a median vertical plane of the fuselage 54. In this case, each engine 56 is a propfan type turboprop comprising two counter-rotating propellers respectively referenced 58*a* and 58*b*. The two propellers extend coaxially with reference to a common axis 60, the front propeller 58*a* extending in front of the rear propeller 58*b*. The two propellers each have blades 61. They can rotate in respectively opposite directions. Each engine 56 is connected to the fuselage 54 via a mast or pylon 62.

We will now describe the arrangement associated with that of the engines 56 shown on FIG. 7, bearing in mind that the other engine, not shown, has a similar arrangement.

Two vibration dampers 64 and 66 are associated with the engine 56. The dampers are attached to minimize transmission of the vibrations generated by the engine to the fuselage 54. As indicated above, these vibrations are generated by imbalances associated with each propeller 58*a* and 58*b*. Each propeller may have an inertial imbalance, an aerodynamic imbalance or even both types of imbalance. The dampers are composed of materials which dissipate vibrations or provide insulation against vibrations. Suspension devices could be used for example.

The vibration dampening efficiency will depend on the arrangement of each damper on the supporting structure. This arrangement comprises the position of the damper as well as its orientation and both parameters must therefore be chosen for each damper (for a given damper position, one orientation may be better than another. Inversely, for a given damper orientation, one position may be better than another). We have seen above that vibrations transmitted by an engine are characterized in particular by the orientation of the major axis 68 of the ellipse 70 associated with the imbalances generating these vibrations. They therefore depend both on the orientation of this major axis 68 as well as its length. In the remainder of this document, we will consider a given fixed operating speed of the engine 56.

The arrangement of each damper 64, 66 is chosen such that, at this given engine speed, irrespective of the direction of the major axis 68, the relative speed of edges or of two ends of the damper is higher than for any other arrangement of the damper. The ends considered are preferably those closest respectively to the engine 56 concerned and the fuselage. The vibrations enter the damper from its upstream end closest to the engine and leave by its downstream end closest to the fuselage, being completely or partially attenuated. This high relative speed means that the damper is a good absorber of the vibrations produced by the engine.

In this case, we even choose the arrangement of each damper such that there is one direction of the major axis for which, at the given engine speed, the relative speed of the ends is higher than for any other direction of the major axis.

This particular direction is shown on FIG. 7.

In other words, the dampening produced by each damper can be considered as a function which depends on the following two variables:

- the arrangement of the damper on the supporting structure; and
- the orientation of the major axis of the ellipse 68.

The arrangement of each damper is therefore chosen such that the absorption reaches an absolute maximum irrespective of the direction of the major axis 68. This choice is made for example after modeling and numerical analysis.

In this case and purely for illustration, the dampers have been placed at the end of the mast 62 adjacent to the fuselage 54. Note that these dampers represent specific components added to the mast 62 and are not formed by the latter which, in addition, intrinsically dampens vibrations itself.

Then, when the aircraft is operating, the engine is controlled such that, at the above-mentioned speed, the ellipse 70 is oriented in a fixed position where its major axis 68 lies in the above-mentioned preferred direction.

In reference to FIG. 8, respective vibration sensors 72 are provided for the propellers 58*a*, 58*b* as close as possible to the excitation plane of the associated propeller. The sensors 72 are attached to a fixed part of the engine. Each sensor can measure the radial acceleration of the associated propeller with respect to the engine sump.

In a variant not shown, two sensors (i.e. a total of four for the engine) are associated with each propeller and arranged to measure the acceleration in two radial directions perpendicular to each other and each perpendicular to the axis 60.

Each engine is also associated with mast accelerometers 74, distributed on the mast 62. In this case, there are three accelerometers, two near a front edge of the mast and one near the rear edge.

The aircraft comprises control means 76 formed in this case by an EEC (Electronic Engine Controller) type unit. The unit 76 is connected to the sensors 72 by lines 78 to receive data from each one. It is also connected by lines to traditional components of the propellers by which the unit receives information concerning the position in degrees and speed in revolutions per minute of the propeller. The unit 76 also receives via respective lines 82, 84, 86 and 88 data concerning the air, the air sampling request, the thrust request and the aircraft at cruising speed.

The aircraft also comprises a synchrophasing unit 90 connected by lines 92 to the three respective accelerometers 74 to receive acceleration data from them indicative of the vibrations running through the mast 62. The unit 90 is also connected by a line 94 to the control unit 76 to receive position and speed data concerning each propeller 58*a* and 58*b*. A line 96 allows the synchrophasing unit to transmit speed setpoints for the front and rear propellers to the control means.

The unit 76 can control a flow in a fuel circuit to adjust the phase of each propeller. The unit 76 therefore takes into account the data received to control the fuel flow in the engine and the pitch of the front and rear propellers, via the line 77 connecting it to the engine.

The units 76 and 90 each form microprocessor electronic control means comprising at least one program stored on a data storage medium such as a hard disk or flash memory. One of the programs includes code instructions capable of controlling implementation of all or part of the method according to the invention when it is executed on these means forming a computer.

Lines 82, 84, 86, 88, 94 and 96 are part of the aircraft onboard data communication network. It is for example an AFDX (Avionics Full Duplex Switch) type network.

To control the engine 56, the synchrophasing unit 90 obtains the position and speed data recorded for each of the two propellers. It determines the true relative phase of the two propellers and the phase to be reached. As explained above, it may also calculate the true angular position of the ellipse 70 and that to be reached. The synchrophasing unit 90 then transmits to the control unit 76 setpoints to place or keep the major axis 68 in the above-mentioned constant direction. It is the direction in which the relative speed of the ends of the absorbers is higher than for any other direction of the major axis.

We therefore see that the invention offers a direct approach to reduce the imbalance vibrations of counter-rotating rotors. An arrangement of the dampers in which absorption of the vibrations is maximized is first determined, then the synchrophasing of the two propellers is controlled so that the vibrations are channeled in this direction. In other words, the major axis of the ellipse is oriented in a suitable direction. The invention therefore represents an arrangement for controlling vibrations which combines the potential of dampers arranged in an optimum direction and site, and the ability of synchrophasing to set the direction of the excitation forces. The energy of the vibrations channeled in a given direction will be dissipated using dampers whose action is optimized in this direction. Under these conditions, as little energy as possible is transmitted to the aircraft supporting structure and in particular to the fuselage 54. The quantity of energy appearing in the engine is also reduced.

An example of an embodiment of the invention has been described, considering the ellipse of the engine inertial imbalances without considering the ellipse of the aerodynamic imbalances. A similar procedure is used to deal with the opposite situation, i.e. to take into account the aerodynamic imbalances and not the inertial imbalances. Lastly, both types of imbalance can be taken into account in order to determine the positions of the dampers. The engine must then be controlled such that the two ellipses are oriented in the optimum directions, i.e. those in which the vibrations from the two origins are efficiently absorbed.

Obviously, numerous modifications can be made without leaving the scope of the invention. The invention is applicable to engines comprising more than two rotating parts independent from each other. The number of dampers 64, 66 may be equal to one or greater than or equal to three.

The invention claimed is:

1. Method for manufacturing an aircraft comprising at least one engine having counter-rotating rotors, the engine or at least one of the engines having imbalances associated with at least one ellipse, the method comprising the step of attaching at least one vibration damper to the aircraft in an arrangement such that, at a given engine speed and for at least one given direction of a major axis of the ellipse or at least one of the ellipses, a relative speed of two ends of the damper is higher than for any other arrangement of the damper.

2. Aircraft comprising at least one engine having counter-rotating rotors, the engine or at least one of the engines having imbalances associated with at least one ellipse, the aircraft comprising at least one vibration damper attached in an arrangement such that, at a given engine speed and for at least one given direction of a major axis of the ellipse or at least one of the ellipses, a relative speed of two ends of the damper is higher than for any other arrangement of the damper.

3. Aircraft according to claim 2, wherein the arrangement of the damper is such that the relative speed is higher than for any other arrangement of the damper, irrespective of the direction of the major axis.

4. Aircraft according to claim 2, wherein the arrangement of the damper is such that there is one direction of the major axis for which, at the given speed, the relative speed of the two ends is higher than for any other direction of the major axis.

5. Aircraft according to claim 2, which comprises at least one sensor, capable of measuring the engine vibrations.

6. Aircraft according to claim 2, which comprises means capable of controlling the engine or at least one of the engine in order to keep the major axis in a constant direction.

7. Method for controlling an aircraft according to claim 2, wherein the engine or at least one of the engines is controlled so as to keep the major axis in a constant direction.

8. Computer program comprising instructions capable of controlling execution of a method according to claim 1 when it is executed on a computer.

9. Data storage medium comprising a program according to claim 8.

* * * * *